United States Patent
Dudar et al.

(10) Patent No.: US 10,107,233 B2
(45) Date of Patent: Oct. 23, 2018

(54) EVAPORATIVE EMISSIONS DIAGNOSTICS FOR A MULTI-PATH PURGE EJECTOR SYSTEM

(71) Applicant: Ford Global Technologies, LLC, Dearborn, MI (US)

(72) Inventors: Aed M. Dudar, Canton, MI (US); Scott A. Bohr, Novi, MI (US); Matthew Werner, Marysville, MI (US); Matthew Masucci, Ballwin, MO (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 15/370,606

(22) Filed: Dec. 6, 2016

(65) Prior Publication Data
US 2018/0156162 A1 Jun. 7, 2018

(51) Int. Cl.
*F02M 25/08* (2006.01)
*F02D 41/00* (2006.01)
*F02D 41/26* (2006.01)
*B01D 53/04* (2006.01)

(52) U.S. Cl.
CPC ..... *F02M 25/0818* (2013.01); *B01D 53/0407* (2013.01); *B01D 53/0454* (2013.01); *F02D 41/004* (2013.01); *F02D 41/0045* (2013.01); *F02D 41/26* (2013.01); *F02M 25/089* (2013.01); *F02M 25/0836* (2013.01); *F02M 25/0854* (2013.01); *F02M 25/0872* (2013.01); *B01D 2257/7022* (2013.01); *B01D 2259/4516* (2013.01); *F02D 2200/0406* (2013.01)

(58) Field of Classification Search
CPC ........... F02M 25/0818; F02M 25/0836; F02M 25/0854; F02M 25/0872; F02M 25/089; B01D 53/0407; B01D 53/0454; B01D 2257/7022; B01D 2259/4516; F02D 41/004; F02D 41/0045; F02D 41/26; F02D 2200/0406; F02D 19/0621; F02D 41/003; F02D 41/0032; F02D 41/0037; F02D 41/0042
USPC ........ 123/520, 519, 521, 698, 516; 701/103; 60/283; 70/114.39
See application file for complete search history.

(56) References Cited

U.S. PATENT DOCUMENTS

| | | | |
|---|---|---|---|
| 9,133,796 B2 | 9/2015 | Plymale et al. | |
| 2014/0196694 A1* | 7/2014 | Euliss | F02M 25/08 123/520 |
| 2014/0251284 A1* | 9/2014 | Plymale | F02M 25/089 123/518 |
| 2016/0290285 A1* | 10/2016 | Dudar | F02M 25/089 |
| 2016/0341155 A1* | 11/2016 | Dudar | F02M 25/0836 |
| 2016/0368373 A1* | 12/2016 | Dudar | B60K 15/077 |

(Continued)

*Primary Examiner* — Thomas Moulis
*Assistant Examiner* — John Bailey
(74) *Attorney, Agent, or Firm* — Julia Voutyras; McCoy Russell LLP

(57) ABSTRACT

Methods and systems are provided for diagnosing a high load purge line of a boosted engine system for undesired evaporative emissions. In one example, a method for diagnosing the high load purge line includes drawing vacuum in the high load purge line under natural aspiration conditions and concurrently purging a fuel vapor canister. In this way, the high load purge line may be diagnosed for undesired evaporative emissions without disrupting a canister purge schedule.

20 Claims, 5 Drawing Sheets

(56) References Cited

U.S. PATENT DOCUMENTS

2017/0314512 A1* 11/2017 Dudar ................ F02M 25/0827
2018/0030932 A1* 2/2018 Dudar ................ F02M 25/0809

* cited by examiner

EVAPORATIVE EMISSIONS DIAGNOSTICS FOR A MULTI-PATH PURGE EJECTOR SYSTEM

FIELD

The present description relates generally to methods and systems for controlling flow and diagnosing components in a fuel vapor recovery system for a vehicle with a boosted internal combustion engine.

BACKGROUND/SUMMARY

Vehicles may be fitted with evaporative emission control systems such as onboard fuel vapor recovery systems. Such systems capture and reduce the release of vaporized hydrocarbons (HCs), such as fuel vapors released from a vehicle gasoline tank during refueling, to the atmosphere. Specifically, the vaporized HCs are stored in a fuel vapor canister packed with an adsorbent that adsorbs and stores the vapors. At a later time, when the engine is in operation, the evaporative emission control system purges the vapors into an engine intake manifold for use as fuel. The evaporative emissions system may include an ejector system, one more check valves, and/or one or more controller-actuatable valves for facilitating vapor purge under boosted or non-boosted engine operation.

Various approaches have been developed to diagnose and detect degradation in ejector system components adjacent to ejector inlets and/or upstream of the ejector inlets. However, such approaches fail to diagnose or detect degradation in the ejector system downstream of an ejector outlet. For example, a high load purge line may be used to couple the ejector outlet to an air intake system (AIS) of the engine at a position upstream of a compressor. During purge under high load operation (e.g., when the engine is under boost conditions), vapors may be routed to the engine intake via the high load purge line. If the high load purge line degrades, any resulting undesired evaporative emissions may go undetected.

The inventors herein have recognized the above-mentioned disadvantages and have developed a dual path purge system for an engine. In one example approach, a method is provided, comprising, in a first condition, purging fuel vapors from a fuel vapor canister through an ejector unit into an air intake system of an engine without simultaneously conducting a test for undesired evaporative emissions on a high load purge line coupled between the ejector unit and the air intake system; and in a second condition, purging fuel vapors from the fuel vapor canister while simultaneously conducting the test for undesired evaporative emissions on the high load purge line.

As one example, in the first condition, vapors may be purged from the fuel vapor canister under both boost and manifold vacuum conditions. In the second condition, fuel vapors may be purged from the fuel vapor canister under natural aspiration conditions but not boost conditions. In the second condition, a check valve mounted at the connection of the AIS and the high load purge line that opens during boost and closes under manifold vacuum conditions enables vacuum to be drawn on the high load purge line, which in turn enables the test for undesired evaporative emissions on the high load purge line to be performed. Furthermore, the check valve enables the high load purge line diagnostic test to be performed during canister purging, which reduces the disruption of engine operation by evaporative emissions system diagnostic tests. As an additional advantage, the check valve prevents the flow of unmetered air through the ejector during natural aspiration.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
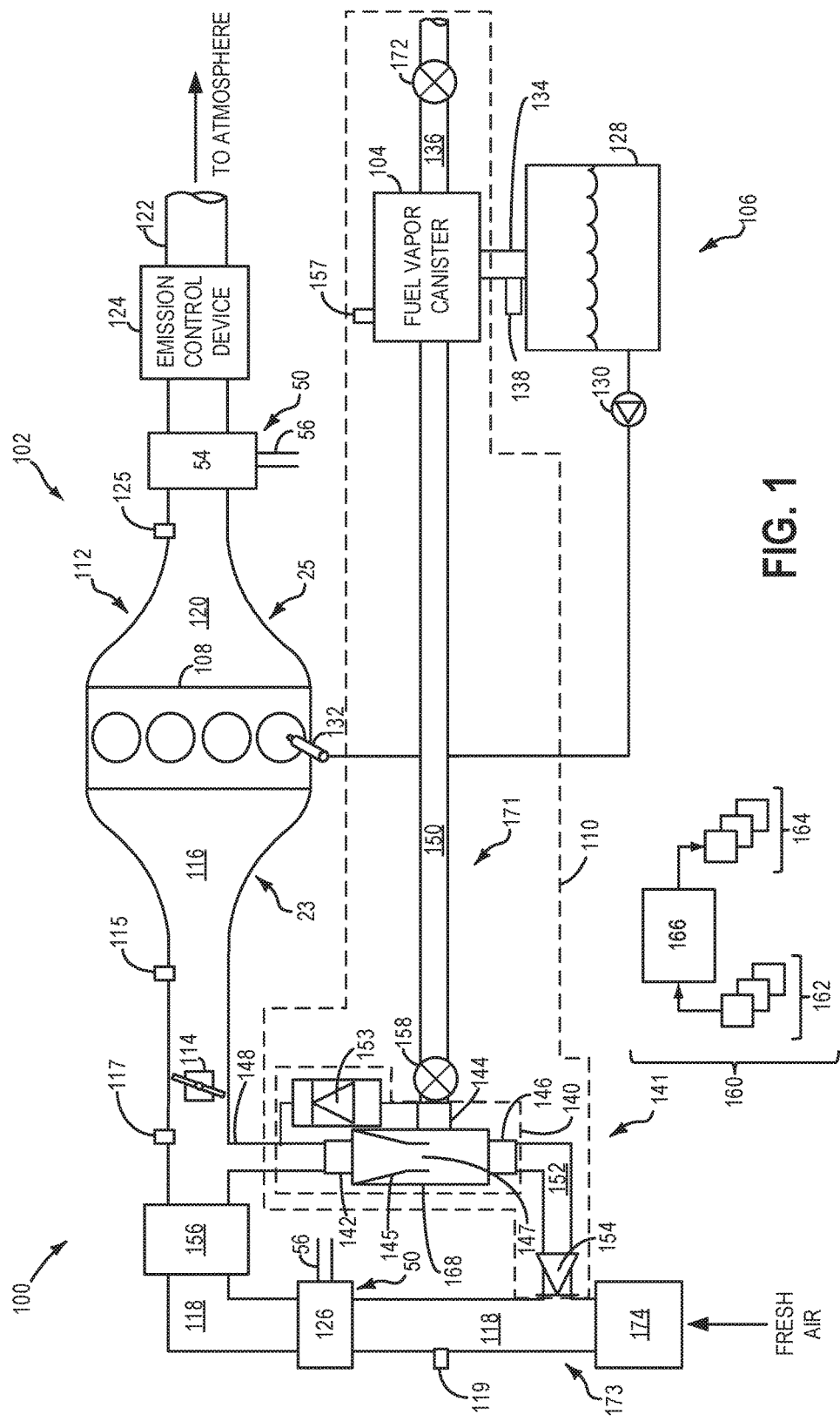
FIG. 1 shows a schematic diagram of an embodiment of a multi-path evaporative emissions control system of a vehicle.

The following description relates to systems and methods for diagnosing the presence or absence of undesired evaporative emissions in a fuel system and evaporative emissions system of a boosted vehicle system, such as the example vehicle system shown in FIG. 1. Degradation of canister-side components of the evaporative emissions system, which include components upstream of an ejector system, may be diagnosed according to the method of FIG. 2. Responsive to an indication of an absence of canister-side degradation, or degradation of a high load purge line fluidically coupling an ejector outlet and an air induction system (AIS) may be detected according to the method of FIG. 3. Notably, the high load purge line may be diagnosed in the absence of canister purging or during purging by monitoring fuel tank pressure, with examples of fuel tank pressure profiles achieved during canister purging illustrated in FIG. 4. An example timeline for conducting canister-side diagnostics according to the method of FIG. 2 and high load purge line diagnostics according to the method of FIG. 3 is illustrated in FIG. 5.

FIG. 1 shows a schematic depiction of a vehicle system 100. The vehicle system 100 includes an engine system 102 coupled to an evaporative emissions system 110 and a fuel system 106. The evaporative emissions system may also be referred to as a fuel vapor purging or fuel vapor recovery system. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust passage 122 may include one or more emission control devices 124, which may be mounted in a close-coupled position in the exhaust. One or more emission control devices may include a three-way catalyst, lean NO, trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure (e.g., higher than atmospheric pressure). Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gas may be directed through the turbine. Alternatively, such as when a smaller amount of boost is requested, some or all of the exhaust gas may bypass turbine 54 via a turbine bypass passage as controlled by a wastegate (not shown). An amount of boost may additionally or optionally be controlled by controlling an amount of intake air directed through compressor 126. A controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

Fuel system 106 may include a fuel tank 128 coupled to a fuel pump system 130. The fuel pump system 130 may include one or more pumps for pressurizing fuel delivered to fuel injectors 132 of engine 112. While a single fuel injector 132 is shown, additional injectors may be provided for each cylinder. For example, engine 112 may be a direct injection gasoline engine, and additional injectors may be provided for each cylinder. It will be appreciated that fuel system 106 may be a return-less fuel system, a return fuel system, or various other types of fuel system. In some examples, a fuel pump may be configured to draw fuel from the tank bottom. Vapors generated in fuel system 106 may be routed to evaporative emissions system 110, described further below, via conduit 134 before being purged to the engine intake 23.

Evaporative emissions system 110 includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. In some examples, a canister vent valve (CVV) 172 may be located along vent 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed. In some examples, an evaporative leak check module (ELCM) may be disposed in vent 136 and may be configured to control venting and/or assist in undesired evaporative emissions detection. Furthermore, in some examples, one or more oxygen sensors may be positioned in the engine intake 116 or coupled to the canister 104 (e.g., downstream of the canister), to provide an estimate of canister load. In still further examples, one or more temperature sensors 157 may be coupled to and/or within canister 104. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister and may be used to estimate canister load.

Conduit 134 may optionally include a fuel tank isolation valve (not shown). Among other functions, fuel tank isolation valve may allow the fuel vapor canister 104 to be maintained at a low pressure or vacuum without increasing the fuel evaporation rate from the tank (which would otherwise occur if the fuel tank pressure were lowered). Conduit 134 may include a fuel tank pressure transducer (FTPT) 138. Specifically, FTPT 138 may monitor the pressure in the fuel tank. The fuel tank 128 may hold a plurality of fuel blends, including fuel with a range of alcohol concentrations, such as various gasoline-ethanol blends, including E10, E85, gasoline, etc., and combinations thereof.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104 and then to the atmosphere through vent 136. In this way, an increased amount of vaporized HCs may be stored in fuel vapor canister 104. During a later engine operation, the stored vapors may be released back into the incoming air charge via evaporative emissions system 110.

Evaporative emissions system 110 may include a dual path purge system 171. Purge system 171 is coupled to canister 104 via a conduit 150. Conduit 150 may be coupled to an ejector unit 140 in an ejector system 141, as shown in FIG. 1. Conduit 150 may include a canister purge valve (CPV) 158 disposed in conduit 150. Specifically, CPV 158 may regulate the flow of vapors along conduit 150. The quantity and rate of vapors released by CPV 158 may be determined by the duty cycle of an associated CPV solenoid (not shown). In one example, the duty cycle of CPV the CPV solenoid may be determined by controller 166 responsive to engine operating conditions, including, for example, an air-fuel ratio. By commanding the CPV to be closed, the controller may seal the fuel vapor canister from the fuel vapor purging system such that no vapors are purged via the fuel vapor purging system. In contrast, by commanding the CPV to be open, the controller may enable the fuel vapor purging system to purge vapors from the fuel vapor canister under either boosted or non-boosted modes and/or diagnose components of the fuel vapor recovery system, as described further below with regard to FIGS. 2 and 3. As shown in FIG. 1, CPV 158 is positioned immediately adjacent to ejector unit 140, enabling a canister-side of evaporative emissions system 110 to be diagnosed, as described with regard to FIG. 2. As referred to herein, the canister-side of the evaporative emissions system includes components upstream of ejector unit 140 on the canister-side, including CPV 158, conduit 150, fuel vapor canister 104, vent 136, and CVV 172.

A conduit 148 may be coupled to ejector unit 140 at a first port or inlet 142. Ejector unit 140 is coupled to intake 23 at a position upstream of throttle 114 and downstream of compressor 126 via conduit 148. During boost conditions, conduit 148 may direct compressed air in intake conduit 118 downstream of compressor 126 into ejector unit 140 via port 142. Ejector unit 140 includes a second port 144 or inlet coupling ejector unit 140 to conduit 150.

Ejector unit 140 may be further coupled to intake conduit 118 at a position upstream of compressor 126 via a high load purge line 152 coupled to a third port 146 or outlet of ejector unit 140. A check valve 154 may be mounted directly to air induction system 173 at a position between air filter 174 and compressor 126 at the connection of high load purge line 152. Check valve (e.g., one-way check valve) 154 may prevent intake air from flowing through air filter 174 into high load purge line 152 and into intake manifold 116 via ejector unit 140 during manifold vacuum conditions and allow the flow of air and fuel vapors from conduit 150 into intake passage 118 via high load purge line 152 during boost conditions. Furthermore, check valve 154 may enable vacuum to be drawn on high load purge line 152 during manifold vacuum conditions, thereby enabling high load purge line 152 to be diagnosed for undesired evaporative emissions, as described below with regard to FIG. 3.

Ejector unit 140 includes a housing 168 encasing the entire ejector unit coupled to ports 146, 144, and 142. In one example, only the three ports 146, 144, and 142 are included in ejector unit 140. Ejector unit 140 may include various check valves disposed therein. For example, in some examples, ejector unit 140 may include a check valve positioned adjacent to each port in ejector unit 140 so that unidirectional flow of fluid or air is present at each port. In the example illustrated in FIG. 1, ejector unit 140 includes a built-in check valve 153 that may allow gases to flow from conduit 150 to intake manifold 116 via conduit 148 during manifold vacuum conditions and prevent air from flowing from conduit 148 to conduit 150 during boost conditions. For example, air from intake conduit 118 downstream of compressor 126 may be directed into ejector unit 140 via inlet port 142 and may flow through the ejector and exit the ejector at outlet port 146 before being directed into intake conduit 118 at a position upstream of compressor 126. This flow of air through the ejector unit may create a vacuum due to the Venturi effect at inlet port 144 so that vacuum is provided to conduit 150 via port 144 during boosted operating conditions. In particular, a low pressure region is created adjacent to inlet port 144 that may be used to draw purge vapors from the canister into ejector unit 140.

Ejector unit 140 includes a nozzle 145 comprising an orifice that converges in a direction from inlet 142 toward suction inlet 144 so that when air flows through ejector unit 140 in a direction from port 142 toward port 146, a vacuum is created at port 144 due to the Venturi effect. This vacuum may be used to assist in fuel vapor purging during certain conditions, e.g., during boosted engine conditions. In one example, ejector unit 140 is a passive component. That is, ejector unit 140 is designed to provide vacuum to the fuel vapor purge system via conduit 150 to assist in purging under various conditions without being actively controlled.

Thus, whereas CPV 158 and throttle 114 may be controlled via controller 166, for example, ejector unit 140 may be neither controlled via controller 166 nor subject to any other active control. In another example, the ejector unit 140 may be actively controlled with a variable geometry to adjust an amount of vacuum provided by the ejector unit to the fuel vapor recovery system via conduit 150.

During select engine and/or vehicle operating conditions, such as after an emission control device light-off temperature has been attained (e.g., a threshold temperature reached after warming up from ambient temperature) and with the engine running, the controller 166 may adjust the duty cycle of a canister vent valve solenoid (not shown) to open or maintain open CVV 172. For example, CVV 172 may remain open except during certain diagnostic procedures performed on the system. At the same time, controller 166 may adjust the duty cycle of the CPV solenoid to control opening of CPV 158. Pressures within evaporative emissions system 110 may in some examples then draw fresh air through vent 136, fuel vapor canister 104, and CPV 158 such that fuel vapors flow into conduit 150.

The operation of ejector unit 140 within evaporative emissions system 110 during vacuum conditions will now be described. The vacuum conditions may include intake manifold vacuum conditions. For example, intake manifold vacuum conditions may be present during an engine idle condition, with manifold pressure below atmospheric pressure by a threshold amount. Vacuum in the intake system 23 may draw fuel vapor from the canister 104 through conduit 150 and through ejector unit 140. A first (larger) portion of vapors may be drawn into conduit 148 via built-in check valve 153. A second (smaller) portion of vapors may enter the ejector via port 144 and flow through nozzle 145 toward port 142. Specifically, the intake manifold vacuum may cause the second portion of fuel vapors to flow through orifice 147. After passing through the nozzle, the fuel vapors exit ejector unit 140 through first port 142 and flow through conduit 148 to intake passage 118 and then to intake manifold 116. Under manifold vacuum conditions, check valve 154 is closed, preventing the flow of air from AIS 173 to ejector unit 140 via high load purge line 152.

Next, the operation of ejector unit 140 within evaporative emissions system 110 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118 such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector unit 140 via ejector inlet 142. This fluid may include a mixture of air and fuel, for example. After the fluid flows into the ejector via the port 142, it flows through the converging orifice 147 in nozzle 145 in a direction from port 142 toward outlet 146. Because the diameter of the nozzle gradually decreases in a direction of this flow, a low pressure zone is created in a region of orifice 147 adjacent to suction inlet 144. The pressure in this low pressure zone may be lower than a pressure in conduit 150. When present, this pressure differential provides a vacuum to conduit 150 to draw fuel vapor from canister 104. This pressure differential may further induce flow of fuel vapors from the fuel vapor canister, through the CPV, and into port 144 of ejector unit 140. Upon entering the ejector, the fuel vapors may be drawn along with the fluid from the intake manifold out of the ejector via outlet port 146 and into intake 118 at a position upstream of compressor 126 via high load purge line 152 and open check valve 154. Operation of compressor 126 then draws the fluid and fuel vapors from ejector unit 140 into intake passage 118 and through the compressor. After being compressed by compressor 126, the fluid and fuel vapors flow through charge air cooler 156 for delivery to intake manifold 116 via throttle 114.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120, which may be used to estimate an air-fuel ratio of the engine, in one example) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

Diagnostic tests may be periodically performed on the evaporative emissions system 110 and fuel system 106 in order to indicate the presence or absence of undesired evaporative emissions. In one example, under boost conditions (e.g. intake manifold pressure greater than atmospheric pressure by a predetermined threshold), CVV 172 may be commanded closed and CPV 158 may be commanded open. By commanding closed CVV 172 and commanding open CPV 158 during boost conditions, the canister-side of evaporative emissions system 110 and fuel system 106 may be evacuated. Pressure in the fuel system and evaporative emissions control system may be monitored (for example, via FTPT 138) in order to ascertain the presence or absence of undesired evaporative emissions due to canister-side degradation. If a threshold vacuum (e.g. negative pressure threshold with respect to atmospheric pressure) is reached, an absence of gross undesired evaporative emissions may be indicated. As will be discussed in further detail below with respect to FIG. 2, canister-side components of the evaporative emissions system and fuel system may be diagnosed for the presence or absence of undesired evaporative emissions under boost conditions.

In another example, under natural aspiration conditions (e.g., intake manifold vacuum conditions), again CVV 172 may be commanded closed and CPV 158 may be commanded open. By commanding closed CVV 172 and commanding open CPV 158 during natural aspiration conditions, the evaporative emissions control system 110 and fuel system 106 may be evacuated in order to ascertain the presence or absence of undesired evaporative emissions. Specifically, due to the closed position of check valve 154, vacuum may be drawn on the evaporative emissions system 110 and fuel system 106 during natural aspiration conditions. As discussed above, pressure in the fuel system and evaporative emissions control system may be monitored via, for example, FTPT 138. If a threshold vacuum (e.g., negative pressure threshold with respect to atmospheric pressure) is reached, an absence of undesired evaporative emissions may be indicated. In still another example, under natural aspiration conditions, CVV 172 may be maintained open and CPV 158 may be commanded open. By maintaining CVV 172 open and commanding open CPV 158 during natural aspiration conditions, and due to the closed position of check valve 154, the evaporative emissions control system 110 and fuel system 106 may be diagnosed concurrently with canister vapor purging, increasing the number of conditions under which the diagnostic can be performed. As discussed below with regard to FIG. 3, if the diagnostic test under boost conditions is performed first and an absence of canister-side undesired evaporative emissions indicated, the diagnostic test performed under natural aspiration conditions may specifically diagnose high load purge line 152.

Figure 2:
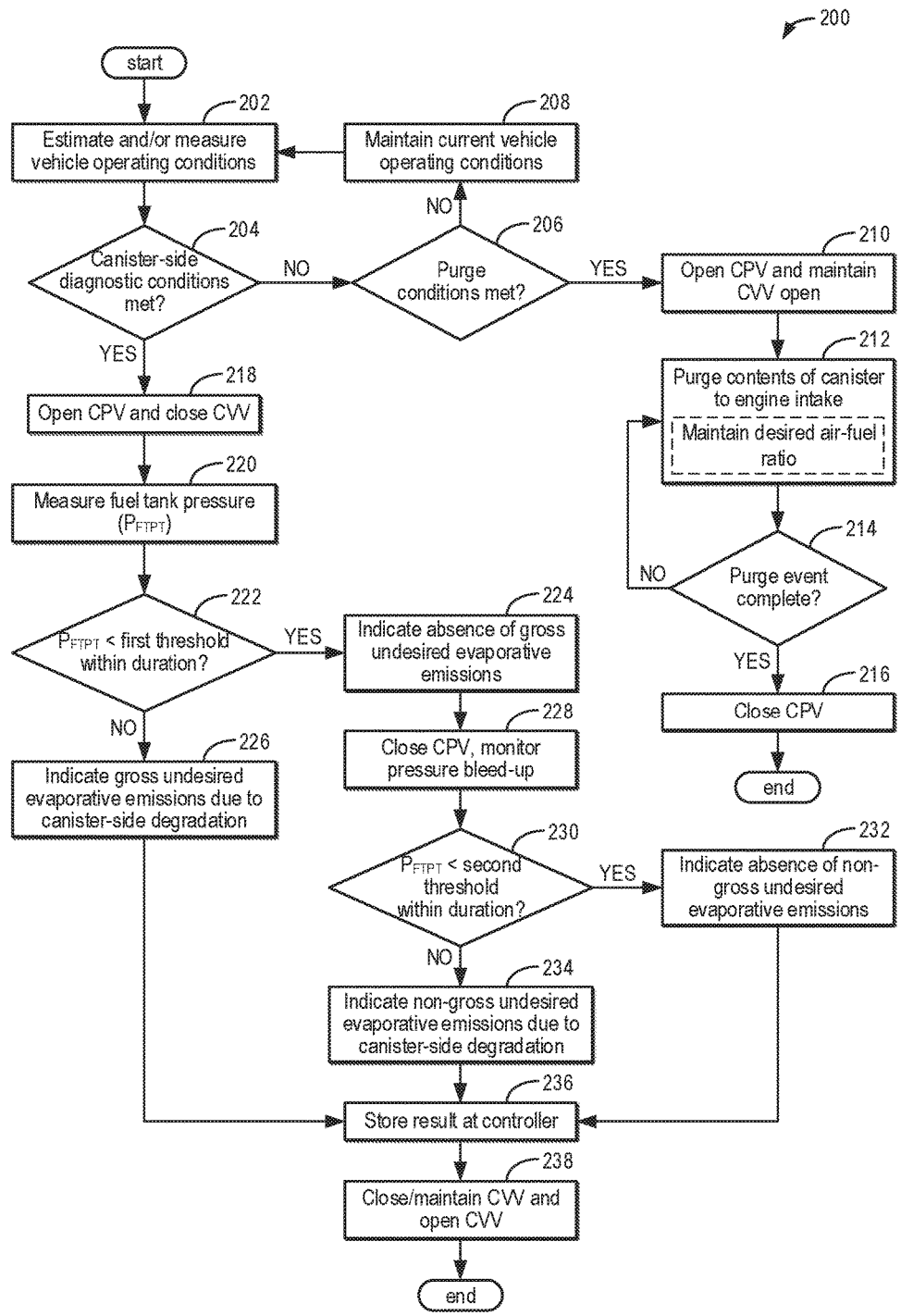
FIG. 2 shows a flow chart of an example method for purging fuel vapors from an evaporative emissions control system and diagnosing components of an evaporative emissions control system.
Figure 3:
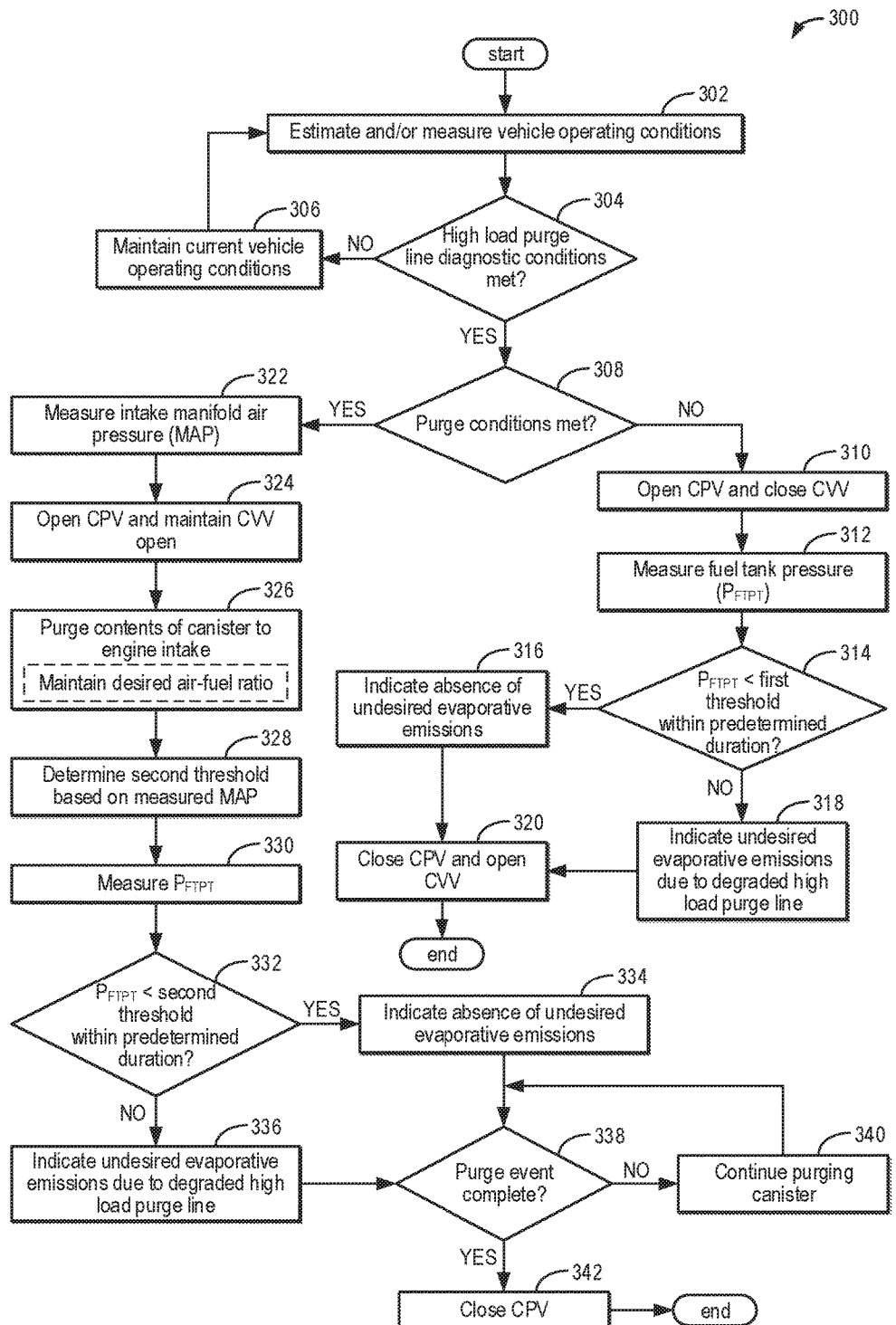
FIG. 3 shows a flow chart of an example method for diagnosing a high load purge line of an evaporative emissions control system, which may be performed during canister purging.

Turning to FIG. 2, a flow chart for a high level example method 200 for performing an evaporative emissions diagnostic procedure on an evaporative emissions control system (e.g., evaporative emissions system 110 of FIG. 1) and fuel system (e.g., fuel system 106 of FIG. 1), is shown. More specifically, method 200 may be used to conduct an evaporative emissions diagnostic procedure responsive to an indication that conditions are met for an evaporative emissions test under boost conditions. Conducting such an evaporative emissions diagnostic procedure may include the fuel system and evaporative emission system being coupled to an ejector unit (e.g., ejector unit 140 of FIG. 1) through an orifice having an inlet pressure reduced by a Venturi effect, thus enabling evacuation of the fuel system and a canister-side of the evaporative emissions system under boost conditions. In this way, by conducting the evaporative emissions test under boost conditions, the canister-side of the evaporative emissions control system and fuel system may be diagnosed for the presence or absence of undesired evaporative emissions.

Method 200 and the rest of the methods included herein will be described with reference to the systems described and shown in FIG. 1, although it should be understood that similar methods may be applied to other systems without departing from the scope of this disclosure. Method 200 may be carried out by a controller, such as controller 166 of FIG. 1, and may be stored at the controller as executable instructions in non-transitory memory. Instructions for carrying out method 200 and the rest of the methods included herein may be executed by the controller based on instructions stored on a memory of the controller and in conjunction with signals received from sensors of the engine system, such as the sensors described above with reference to FIG. 1 (such as MAP sensor 115 and FTPT 138). The controller may employ fuel system and evaporative emissions system actuators, such as CPV 158 of FIG. 1 and CVV 172 of FIG. 1, etc., according to the methods below.

Method 200 begins at 202 and includes estimating and/or measuring vehicle operating conditions. Operating conditions may be estimated, measured, and/or inferred, and may include one or more vehicle conditions, such as vehicle speed, vehicle location, etc.; various engine conditions, such as engine status, engine load, engine speed, A/F, manifold air pressure, etc.; various fuel system conditions, such as fuel level, fuel type, fuel temperature, etc.; various evaporative emissions system conditions, such as fuel vapor canister load, fuel tank pressure, etc.; as well as various ambient conditions, such as ambient temperature, humidity, atmospheric pressure, etc.

Continuing at 204, method 200 includes determining if canister-side diagnostic conditions are met. For example, canister-side diagnostic conditions may include an indication of manifold air pressure (MAP) being greater than atmospheric pressure by a predetermined threshold amount, an indication that a purge event is not in progress, and an absence of an indication of undesired evaporative emissions in the fuel system and/or evaporative emissions system. In some examples, canister-side diagnostic conditions may include MAP being greater than atmospheric pressure by a predetermined threshold for a predetermined duration. Canister-side diagnostic conditions may further include an indication that an evaporative emissions diagnostic test on the evaporative emissions control system and fuel system under boost conditions has not already been conducted during the current drive cycle.

If, at 204, canister-side diagnostic conditions are not met, method 200 proceeds to 206 and includes determining if purge conditions are met. For example, conditions for a canister purge operation may include an indication of an amount of fuel vapor stored in the fuel vapor canister (e.g., fuel vapor canister 104 of FIG. 1) exceeding a predetermined threshold amount, an estimate or measurement of a temperature of an emission control device such as a catalyst being above a predetermined temperature (e.g., the light-off temperature of the catalyst), etc. Conditions may further include an indication of MAP being greater than atmospheric pressure by a predetermined threshold amount or less than atmospheric pressure by a predetermined threshold amount, as purging may occur under boost conditions or manifold vacuum conditions.

If, at 206, purge conditions are not met, the method proceeds to 208 and includes maintaining current vehicle operating conditions. For example, a current status of evaporative emissions system actuators (e.g., CPV, CVV), fuel system actuators (e.g., fuel injectors, etc.), engine operational status (air fuel ratio, spark timing, etc.), may be maintained. Following 208, method 200 may return to 202.

If, at 206, purge conditions are indicated to be met, method 200 proceeds to 210 and includes commanding open the CPV and maintaining the CVV open. Proceeding to step 212, method 200 includes purging the contents of the fuel vapor canister to engine intake. More specifically, by commanding open the CPV and commanding open or maintaining open the CVV, vacuum derived from natural engine aspiration under manifold vacuum conditions or derived from the ejector unit under boost conditions may be routed to the fuel vapor canister, thus drawing atmospheric air through a vent (e.g., vent 136 of FIG. 1) and through the fuel vapor canister. By drawing atmospheric air across the fuel vapor canister, stored fuel vapor may be desorbed and routed to the ejector unit. As discussed above with regard to FIG. 1, under manifold vacuum conditions, upon entering the ejector unit, air and fuel vapors may be drawn out of the ejector via a built-in check valve (e.g., check valve 153 of FIG. 1) or via an orifice of the ejector (e.g., orifice 147) for delivery to an intake passage (e.g., intake passage 118) at a position downstream of a compressor (e.g., compressor 126). Under boost conditions, upon entering the ejector unit, air and fuel vapors may be drawn out of the ejector via an outlet port (e.g., port 146) and into the intake passage at a position upstream of the compressor. Operation of the compressor then may draw the air and fuel vapors through the compressor and through a charge air cooler (e.g., charge air cooler 156) for delivery to an intake manifold of the engine (e.g., intake manifold 116).

In some examples, purging the contents of the fuel vapor canister to the engine intake may include purging until a stored fuel vapor amount in the canister is below a predetermined threshold canister load. For example, during purging, a learned vapor amount/concentration may be used to determine the amount of fuel vapors stored in the canister, and then during a later portion of the purging operation (when the canister is sufficiently purged or empty), the learned vapor amount/concentration can be used to estimate a loading state of the fuel vapor canister. More specifically, one or more exhaust gas oxygen sensors (e.g., sensor 125 of FIG. 1) may be positioned in the engine exhaust to provide an estimate of a canister load (that is, an amount of fuel vapors stored in the canister). Based on the canister load, and further based on engine operating conditions, such as engine speed-load conditions, a purge flow rate may be determined. In one example, purging the canister may include indicating an A/F via, for example, a proportional plus integral feedback controller coupled to a two-state exhaust gas oxygen sensor, and responsive to the A/F indication and a measurement of inducted air flow, generating a base fuel command. To compensate for purge vapors, a reference A/F related to engine operation without purging may be subtracted from the A/F indication and the resulting error signal (compensation factor) generated. As such, the compensation factor may represent a learned value directly related to fuel vapor concentration and may be subtracted from the base fuel command to correct for the induction of fuel vapors.

As discussed above with regard to FIG. 1, in other examples, one or more oxygen sensors may be positioned in the engine intake or coupled to the canister (e.g., downstream of the canister) to provide an estimate of canister load. In still further examples, one or more temperature sensors may be coupled to and/or within the canister (e.g., temperature sensor 157 of FIG. 1). As fuel vapor is desorbed by the adsorbent in the canister, a temperature change may be monitored such that the canister load may be estimated based on the temperature change. For example, a temperature decrease during desorption of fuel vapors may be used to estimate canister load.

Accordingly, proceeding to 214, method 200 includes determining whether the purge event is complete. For example, the purge event may be complete when the canister load reaches a predetermined threshold canister load. If, at 214, it is determined that canister purging is not complete, method 200 may return to 212 to continue to purging the contents of the canister to the engine intake. However, if at 214 it is determined that the purging event is complete, method 200 proceeds to 216 and includes commanding closed the CPV. By commanding closed the CPV, the purging operation may be terminated, as the fuel vapor canister may be sealed from the ejector and the engine intake. Following 216, method 200 ends.

Returning to 204, if canister-side diagnostic conditions are met, method 200 proceeds to 218 and includes commanding open the CPV and commanding closed the CVV. By commanding closed the CVV and commanding open the CPV, vacuum derived from the ejector under boost conditions may be applied to the canister-side of the evaporative emissions system and fuel system. More specifically, by commanding closed the CVV, the evaporative emissions system and fuel system may be sealed from the atmosphere, and canister vapor purging will not occur because no air is drawn through the canister. By commanding open the CPV, vacuum derived from the ejector may be applied to the sealed canister-side of the evaporative emissions system and fuel system.

Proceeding to 220, the method includes measuring fuel tank pressure ($P_{FTPT}$). For example, fuel tank pressure may be monitored via a FTPT positioned in the fuel system and/or evaporative emissions system (e.g., FTPT 138 of FIG. 1). As vacuum builds within the canister-side of the evaporative emissions system and fuel system, the measured pressure may become negative with respect to atmospheric pressure.

At 222, method 200 includes determining if $P_{FTPT}$ is less than a first predetermined threshold within a predetermined duration. The first predetermined threshold may, in some examples, be a function of atmospheric pressure. For example, the threshold may be decreased (e.g., made more negative) with decreasing atmospheric pressure, and increased with increasing atmospheric pressure.

If $P_{FTPT}$ is indicated to be less than the predetermined threshold within the predetermined duration, method 200 proceeds to 224 and includes indicating an absence of gross undesired evaporative emissions. That is, it may be indicated that there are no gross undesired evaporative emissions stemming from the canister-side of the fuel system and/or evaporative emissions system. Furthermore, at 224, method 200 may include setting a flag at the controller to indicate an absence of gross undesired evaporative emissions at the canister-side of the evaporative emissions system and fuel system.

Proceeding to 228, method 200 includes closing the CPV to isolate the fuel system and evaporative emissions system from the atmosphere and from the engine intake and monitoring a pressure bleed-up in the fuel system and canister-side of the evaporative emissions system. Again, pressure may be monitored by a fuel tank pressure sensor. Pressure may be monitored for a predetermined duration, in some examples.

At 230, method 200 includes determining if $P_{FTPT}$ is less than a second predetermined threshold within a predetermined duration. As such, at 230, the method comprises testing for the presence or absence of non-gross undesired evaporative emissions by comparing a measured pressure change in the fuel system and canister-side of the evaporative emission system to a reference pressure change after evacuating the fuel system and canister-side of the evaporative emissions system. If $P_{FTPT}$ is less than the second threshold pressure (or if a rate of pressure bleed-up does not exceed the predetermined pressure bleed-up rate), method 200 proceeds to 232 and includes indicating an absence of non-gross undesired evaporative emissions. However, if pressure in the fuel system and evaporative emissions system is not less than the second threshold pressure (or if a rate of pressure bleed-up exceeds a predetermined pressure bleed-up rate), then method 200 proceeds to 234 and includes indicating non-gross undesired evaporative emissions due to canister-side degradation.

At 236, method 200 includes storing the result of the canister-side evaporative emissions diagnostic procedure at the controller. As will be discussed in further detail below with regard to FIG. 3 and FIG. 5, the result of the evaporative emissions system diagnostic procedure conducted according to method 200 may in some examples be utilized in an evaporative emissions system diagnostic procedure conducted under natural aspiration in order to diagnose a high load purge line. Specifically, the high load purge line may be diagnosed responsive to an absence of undesired evaporative emissions due to canister-side degradation, as described below with reference to FIG. 3.

Continuing to 238, method 200 includes maintaining closed the CPV and commanding open the CVV. By maintaining closed the CPV, the fuel system and evaporative emissions system may be sealed from the engine intake (and from the ejector). Furthermore, by commanding open the CVV, fuel vapors generated in the fuel tank (for example, running loss fuel vapors, refueling vapors, or vapors resulting from diurnal temperature fluctuations) may be routed to the fuel vapor canister for storage.

Returning to 222, if $P_{FTPT}$ is not less than the first predetermined threshold within the predetermined duration, method 200 proceeds to 226 and includes indicating gross undesired evaporative emissions due to canister-side degradation. Furthermore, a malfunction indicator light (MIL) may be illuminated on a dash of the vehicle, for example, alerting a vehicle operator to service the vehicle, and may further include indicating the reason for the MIL. However, a conclusive determination as to the source of the inability to reach the predetermined threshold vacuum may not be indicated at 226. Method 200 then proceeds to 236 and includes storing the result of the evaporative emissions diagnostic at the controller. As such, with undesired evaporative emissions indicated, the high load purge line diagnostic test described with regard to FIG. 3 may not be conducted. Furthermore, a purge schedule of the vehicle may be adjusted (e.g., decreased) to avoid releasing fuel vapors to the atmosphere.

Continuing to 238, method 200 includes commanding closed the CPV and commanding open the CVV. As described above, by commanding closed the CPV, the fuel system and evaporative emissions system may be sealed from the engine intake (and from the ejector unit). Furthermore, by commanding open the CVV, fuel vapors generated in the fuel tank may be routed to the fuel vapor canister for storage. Method 200 may then end.

Turning now to FIG. 3, an example method 300 is depicted for an evaporative emissions system, such as evaporative emissions system 110 of FIG. 1. More specifically, method 300 may be used to conduct an evaporative emissions diagnostic procedure responsive to an indication that conditions are met to diagnose a high load line in a purge system, such as high load purge line 152 of FIG. 1. For example, by first determining the absence of undesired evaporative emissions due to canister-side degradation (e.g., according to the method of FIG. 2), the high load purge line may be specifically diagnosed. In some examples, the high load purge line may be diagnosed under natural aspiration (intake manifold vacuum) conditions when canister purging is not performed. In other examples, the high load purge line may be diagnosed under natural aspiration conditions while simultaneously conducting a canister purging operation. As diagnostics are typically intrusive to engine control features such as canister purging, performing the diagnostic during a purge event is advantageous.

Method 300 begins at 302 and includes estimating and/or measuring vehicle operating conditions. Operating conditions may be estimated, measured, and/or inferred, and may include one or more vehicle conditions, such as vehicle speed, vehicle location, etc.; various engine conditions, such as engine status, engine load, engine speed, A/F, manifold air pressure, etc.; various fuel system conditions, such as fuel level, fuel type, fuel temperature, etc.; various evaporative emissions system conditions, such as fuel vapor canister load, fuel tank pressure, etc.; as well as various ambient conditions, such as ambient temperature, humidity, atmospheric pressure, etc.

At 304, the method includes determining if high load purge line diagnostic conditions are met. For example, high load purge line diagnostic conditions may include an indication of manifold air pressure (MAP) being less than atmospheric pressure by a predetermined threshold amount and no prior indication of undesired evaporative emissions in the fuel system and/or evaporative emissions system. In some examples, high load purge line diagnostic conditions may include MAP being less than atmospheric pressure by a predetermined threshold for a predetermined duration or being maintained at a target pressure for a predetermined duration. High load purge line diagnostic conditions may further include an indication that a canister-side evaporative emissions system diagnostic test, such as the method of FIG. 2, has been performed within a predetermined duration (for example, within 24 hours) with an absence of undesired evaporative emissions indicated.

If high load purge line diagnostic conditions are not met, the method proceeds to 306 and includes maintaining current vehicle operating conditions. For example, a status of evaporative emissions system actuators (e.g., CPV, CVV), fuel system actuators (e.g., fuel injectors, etc.), engine operational status (air fuel ratio, spark timing, etc.), may be maintained. Additionally, even if high load purge line diagnostic conditions are not met, purging may be performed throughout the drive cycle under both manifold vacuum conditions and boost conditions if purge conditions are met, as described above with reference to FIG. 2. Following 306, method 300 may return to 302.

If high load purge line diagnostic conditions are indicated to be met at 304, the method proceeds to 308 and includes determining if purge conditions are met. For example, canister purge conditions may include an indication of an amount of fuel vapor stored in the fuel vapor canister (e.g., fuel vapor canister 104 of FIG. 1) exceeding a predetermined threshold amount, an estimate or measurement of a temperature of an emission control device such as a catalyst being above a predetermined temperature (e.g., the light-off temperature of the catalyst), etc.

If purge conditions are not met, method 300 proceeds to 310 and includes commanding open the CPV (e.g., CPV 158 of FIG. 1) and commanding closed the CVV (e.g., CVV 172 of FIG. 1). By commanding open the CPV and commanding closed the CVV, vacuum derived from natural engine aspiration may be applied to the evaporative emissions system and fuel system. More specifically, by commanding closed the CVV, the evaporative emissions system and fuel system may be sealed from the atmosphere, and canister vapor purging will not occur because no air is drawn through the canister. Additionally, under manifold vacuum conditions, a check valve mounted at the connection of the high load purge line and the AIS (e.g., check valve 154 of FIG. 1) is closed, enabling the natural aspiration of the engine to apply vacuum to the evaporative emissions system, including the high load purge line, and fuel system.

Continuing at 312, the method includes measuring the fuel tank pressure ($P_{FTPT}$). For example, $P_{FTPT}$ may be monitored via a FTPT positioned in the fuel system and/or evaporative emissions system (e.g., FTPT 138 of FIG. 1). As vacuum builds within the evaporative emissions system and fuel system, the measured pressure becomes negative with respect to atmospheric pressure.

At 314, it is determined if $P_{FTPT}$ is less than a first predetermined threshold pressure within a predetermined duration. The predetermined threshold may, in some examples, be a function of atmospheric pressure. For example, the threshold may be decreased (e.g., made more negative) with decreasing atmospheric pressure and increased with increasing atmospheric pressure.

If $P_{FTPT}$ is less than the first threshold within the predetermined duration, method 300 proceeds to 316 and includes indicating an absence of undesired evaporative emissions. That is, it may be indicated that there are no undesired evaporative emissions stemming from the high load purge line of the evaporative emissions system. Furthermore, at 316, method 300 may include setting a flag at the controller to indicate that the test was conducted and that the test passed.

If $P_{FTPT}$ is not less than the first threshold within the predetermined duration, method 300 proceeds to 318 and includes indicating undesired evaporative emissions due to a degraded high load purge line. That is, with canister-side degradation ruled out, it may be assumed that undesired evaporative emissions may be due to degradation of the high load purge line. Furthermore, a MIL may be illuminated on a dash of the vehicle, for example, alerting a vehicle operator to service the vehicle, and may further include indicating the reason for the MIL. Additionally, a purge schedule may be adjusted to prevent purging under boost conditions (e.g., purging may be performed under natural aspiration conditions but not under boost conditions) until it is indicated that the high load purge line has been replaced or repaired in order to avoid undesired evaporative emissions during a purge event.

From both 316 and 318, method 300 proceeds to 320 and includes commanding closed the CPV and commanding open the CVS. By commanding closed the CPV, the fuel system and the canister-side of the evaporative emissions system may be sealed from the engine intake (and from the ejector). Furthermore, by commanding open the CVV, fuel vapors generated in the fuel tank (for example, running loss fuel vapors, refueling vapors, or vapors resulting from diurnal temperature fluctuations) may be routed to the fuel vapor canister for storage. Following 320, method 300 ends.

Returning to 308, if purge conditions are met, the method proceeds to 322 and includes measuring the intake manifold air pressure (MAP). For example, MAP may be measured by a MAP sensor (e.g., MAP sensor 115 of FIG. 1).

At 324, the method includes commanding open the CPV and maintaining open the CVV in order to simultaneously purge the fuel vapor canister and diagnose the high load purge line. Continuing to 326, the method includes purging the contents of the fuel vapor canister to the engine intake. More specifically, by commanding open the CPV and maintaining open the CVV, vacuum derived from the intake manifold during natural aspiration may be routed to the fuel vapor canister (e.g., fuel vapor canister 104 of FIG. 1), thus drawing atmospheric air through a vent (e.g., vent 136 of FIG. 1) and through the fuel vapor canister. By drawing atmospheric air across the fuel vapor canister, stored fuel vapor may be desorbed and routed to the ejector unit. Under vacuum conditions, a check valve within the ejector unit (e.g., check valve 153 of FIG. 1) is open, enabling fuel vapors to be delivered to the intake manifold via a conduit coupling the ejector unit to the engine intake (e.g., conduit 148 of FIG. 1). As discussed above with reference to FIG. 2, purging the canister may include determining a compensation factor based on the fuel vapor concentration that may be subtracted from the base fuel command to correct for the induction of fuel vapors to maintain a desired A/F.

At 328, the method includes determining a second threshold pressure based on the measured MAP. That is, with the CVV open, the amount of vacuum achievable in the evaporative emissions system and fuel system varies based on MAP, as described below. Additionally, the threshold may change if MAP changes significantly during purging.

Figure 4:
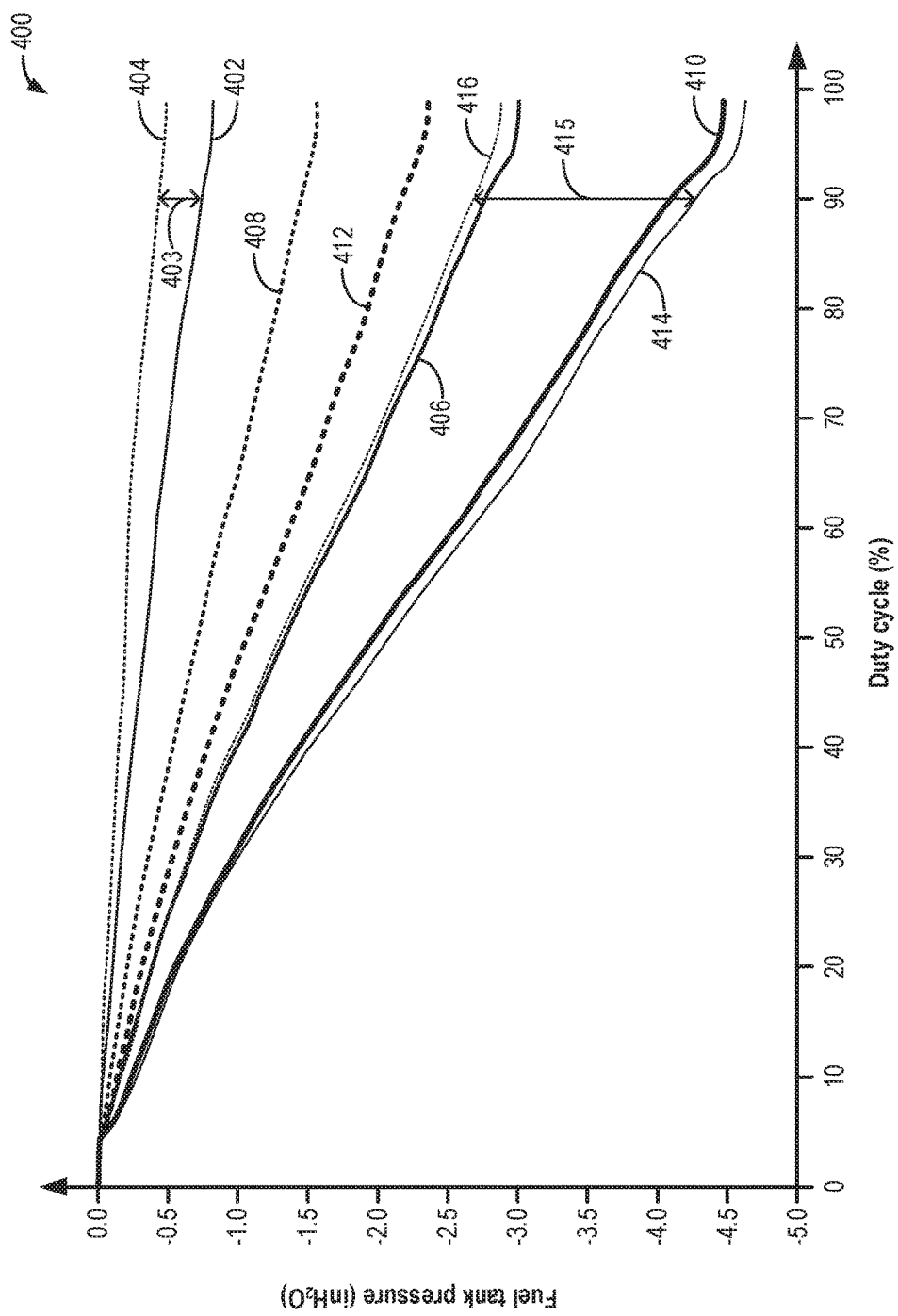
FIG. 4 is a graph illustrating example fuel tank pressure profiles that may be measured while conducting an evaporative emissions system diagnostic procedure according to the method of FIG. 3.
Figure 5:
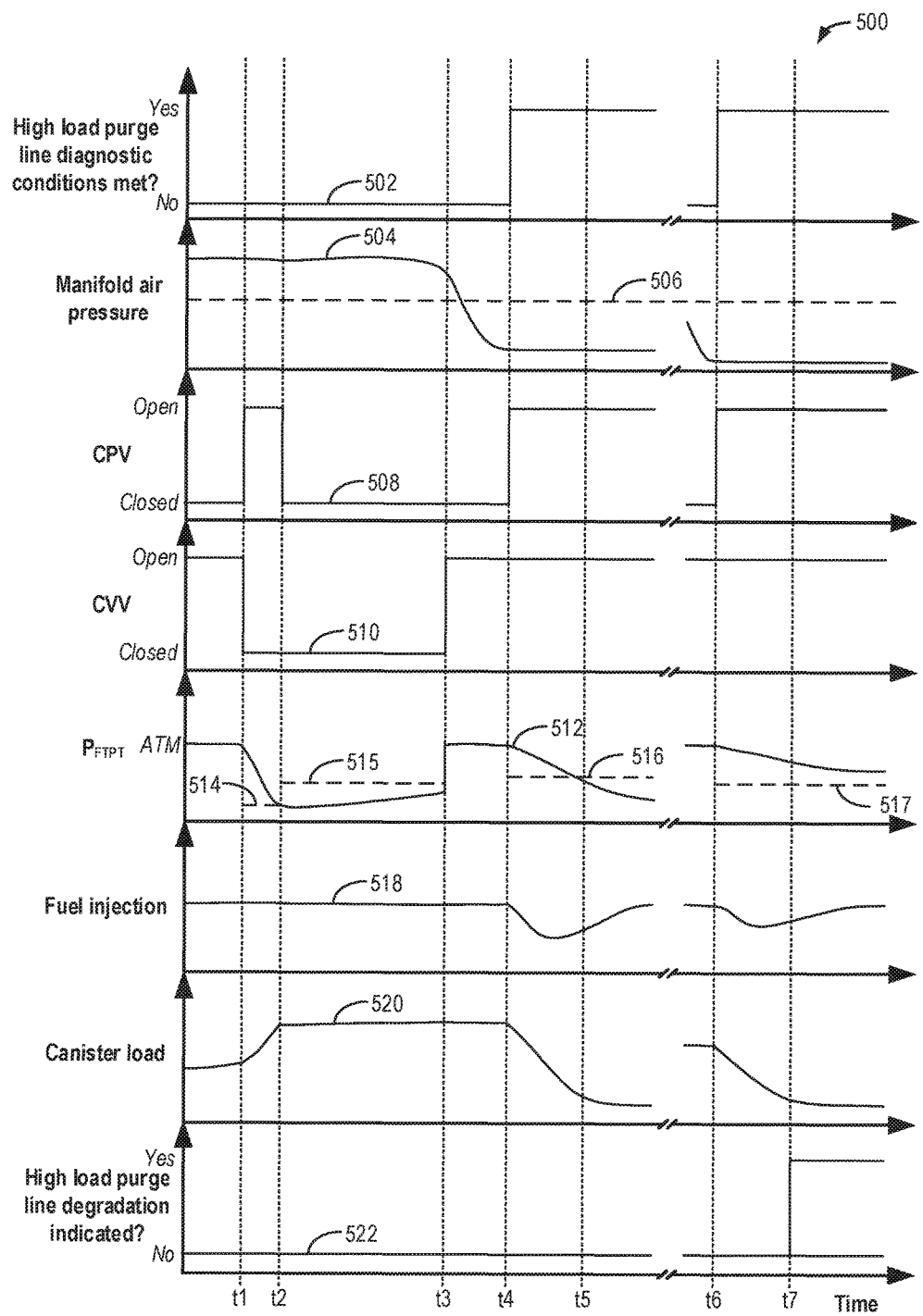
FIG. 5 shows an example timeline for conducting evaporative emissions diagnostic procedures under both boost conditions and natural aspiration conditions according to the methods of FIGS. 2 and 3.

Turning briefly to FIG. 4, the relationship between MAP and fuel tank pressure with the CVV open will now be discussed. FIG. 4 shows a graph 400 of example fuel tank pressure profiles at various manifold vacuums (e.g., negative manifold pressures relative to atmospheric pressure) while the CVV is maintained open. Under manifold vacuum conditions, a check valve mounted at the connection of the high load purge line and the AIS (e.g., check valve 154 of FIG. 1) is closed, enabling the natural aspiration of the engine to draw vacuum on the evaporative emissions control system and fuel system with both the CPV and the CVV open. The X-axis of graph 400 represents the duty cycle of the CPV, and the Y-axis represents the fuel tank pressure (for example, as measured by FTPT 138 of FIG. 1). Dashed lines represent example pressure profiles for an evaporative emissions system with a disconnected high load purge line, and solid lines represent example pressure profiles for an evaporative emissions system with a connected high load purge line. An example fuel tank pressure profile measured when MAP is −1 inHg for a connected high load purge line is shown at plot 402, an example fuel tank pressure profile measured when MAP is −1 inHg for a disconnected high load purge line is shown at plot 404, an example fuel tank pressure profile measured when MAP is −5 inHg for a connected high load purge line is shown at plot 406, an example fuel tank pressure profile measured when MAP is −5 inHg for a disconnected high load purge line is shown at plot 408, an example fuel tank pressure profile measured when MAP is −9 inHg for a connected high load purge line is shown at plot 410, an example fuel tank pressure profile measured when MAP is −9 inHg for a disconnected high load purge line is shown at plot 412, an example fuel tank pressure profile measured when MAP is −13 inHg for a connected high load purge line is shown at plot 414, and an example fuel tank pressure profile measured when MAP is −13 inHg for a disconnected high load purge line is shown at plot 416.

As the duty cycle of the CPV increases, the flow of air and vapors through the CPV increases, resulting in decreased pressure (e.g., more vacuum) in the fuel tank. As illustrated in FIG. 4, fuel tank pressure decreases nearly linearly as the duty cycle of the CPV increases until a minimum is reached between 90 and 100% duty cycle. Further, as the duty cycle of the CPV increases, the difference between the pressures measured for an evaporative emissions system with a disconnected high load purge line and a connected high load purge line at a given MAP increases. Further still, as the amount of manifold vacuum increases, the difference between the pressures measured for an evaporative emissions system with a disconnected high load purge line and a connected high load purge line generally increases. For example, at 90% CPV duty cycle, the fuel tank pressure difference between a connected (plot 414) and disconnected (plot 416) high load purge line at a MAP of −13 inHg (indicated at 415) is greater than the fuel tank pressure difference between a connected (plot 402) and disconnected (plot 404) high load purge line at a MAP of −1 inHg (indicated at 403). As such, it may be beneficial to perform the diagnostic at high manifold vacuum and high CPV duty cycle in order to increase the separation between the nominal response and the degraded response for more robust results.

Returning to FIG. 3, at 328, the second threshold may thus be determined as a function of the MAP and the commanded CPV duty cycle, with the threshold decreasing (e.g., becoming a more negative value) as MAP decreases (e.g., the amount of vacuum increases) and the CPV duty cycle increases. For example, the controller may make a logical determination regarding an appropriate pressure threshold based on logic rules that are a function of the MAP and the commanded CPV. In another example, the second threshold may be determined via a lookup table stored in non-transitory memory of the controller that indicates the appropriate threshold given the measured MAP and commanded CPV duty cycle.

Continuing to 330, the method includes measuring $P_{FTPT}$. For example, fuel tank pressure may be monitored via a FTPT positioned in the fuel system and/or evaporative emissions system (e.g., FTPT 138 of FIG. 1). As vacuum builds within the evaporative emissions system and fuel system, the measured pressure becomes negative with respect to atmospheric pressure.

At 332, the method includes determining if $P_{FTPT}$ is less than (e.g., more negative than) the second threshold (as determined at 328) within a predetermined duration. If $P_{FTPT}$ is less than the second threshold within the duration, the method proceeds to 334 and includes indicating the absence of undesired evaporative emissions, as described above at 316.

If $P_{FTPT}$ is not less than (e.g., not more negative than) the second threshold within the duration, the method proceeds to 336 and includes indicating undesired evaporative emissions due to a degraded high load purge line. That is, with canister-side degradation ruled out, it may be assumed that undesired evaporative emissions may be due to degradation of the high load purge line. As at 318, a MIL may be illuminated to alert the vehicle operator to service the vehicle, and may further include indicating the reason for the MIL.

From both 334 and 336, the method proceeds to 338 and includes determining if the purge event is complete. As discussed with reference to FIG. 2, in some examples, purging the contents of the fuel vapor canister to the engine intake may include purging until a stored fuel vapor amount in the canister is below a predetermined threshold canister load. If the purge event is not complete, the method proceeds to 340 and includes continuing purging the canister. If the purge event is complete, the method proceeds to 342 and includes commanding closed the CPV. Following 342, method 300 ends.

Turning now to FIG. 5, an example timeline for conducting evaporative emissions diagnostic procedures under both boost conditions and natural aspiration conditions is shown. Specifically, canister-side degradation may be diagnosed under boost conditions according to the method of FIG. 2, and responsive to an indication of an absence of canister-side degradation, undesired evaporative emissions due to a degraded high load purge line may be subsequently diagnosed under manifold vacuum conditions according to the method of FIG. 3. An indication of whether conditions are met for conducting a high load line diagnostic procedure is shown at plot 502, MAP is shown at plot 504, CPV position is shown at plot 508, CVV position is shown at plot 510, fuel system pressure ($P_{FTPT}$) is shown at plot 512, fuel injection is shown at 518, canister load is shown at 520, and an indication of high load purge line degradation is shown at 522. Furthermore, atmospheric pressure is indicated by dashed line 506, a target $P_{FTPT}$ is indicated by dashed segment 514, a first threshold $P_{FTPT}$ is indicated by dashed segment 515, a second threshold $P_{FTPT}$ is indicated by dashed segment 516, and a third threshold $P_{FTPT}$ is indicated by dashed segment 517. For all of the above, the X-axis represents time, with time increasing from left to right. The Y-axis refers to the labeled parameter, with values increasing from bottom to top except for plot 502, in which whether high load purge line diagnostic conditions are met is indicated as "yes" or "no"; plot 508, in which the position of the CPV is indicated as "open" (referring to a fully open position of the CPV) and "closed" (referring to a fully closed position of the CPV); plot 510, in which the position of the CVV is indicated as "open" (referring to a fully open position of the CVV) and "closed" (referring to a fully closed position of the CVV); and plot 522, in which high load purge line degradation is indicated as "yes" or "no."

Prior to time t1, the engine is boosted. That is, manifold air pressure, as measured by a manifold pressure sensor (e.g., MAP sensor 115 of FIG. 1) and shown in plot 504, is greater than atmospheric pressure (dashed line 506). Additionally, the CPV (e.g., CPV 158 of FIG. 1) is in a closed position (plot 508) so that no air or purge vapors may pass through or across the valve. The CVV (e.g., CVV 172 of FIG. 1) is in an open position, allowing $P_{FTPT}$ (for example, as measured by FTPT 138 of FIG. 1) to be maintained at atmospheric pressure (ATM) (plot 512).

At time t1, canister-side diagnostic conditions are met, as described with reference to FIG. 2. For example, canister-side diagnostic conditions may include MAP being greater than atmospheric pressure by a predetermined threshold amount, an indication that a purge event is not in progress, and an absence of an indication of undesired evaporative emissions in the fuel system and/or evaporative emissions system. Responsive to the canister-side diagnostic conditions being met at t1, the CVV is commanded closed (plot 510), sealing the fuel system and the evaporative emissions system from the atmosphere, and the CPV is commanded open (plot 508). With the CVV closed, air from the atmosphere is not drawn across the vapor canister (e.g., fuel vapor canister 104 of FIG. 1), and thus, canister vapor purging does not occur.

Between time t1 and t2, under boost conditions, vacuum develops in the evaporative emissions system (such as evaporative emissions system 110 of FIG. 1) and fuel system (e.g., fuel system 106 of FIG. 1) due to the flow of boosted air across the ejector unit creating a vacuum at the suction inlet of the ejector (e.g., inlet 144 of FIG. 1). Thus, as illustrated by plot 512, $P_{FTPT}$ decreases between t1 and t2, which may be referred to as a vacuum pulldown phase. In other words, pressure in the fuel system and evaporative emissions system is lowered with respect to atmospheric pressure. At time t2, $P_{FTPT}$ (plot 512) reaches the predetermined target pressure (dashed segment 514). Accordingly, because the predetermined target pressure was reached, gross undesired evaporative emissions are not indicated (not shown). Such results may be stored at the controller (e.g., controller 166 of FIG. 1), as discussed above with regard to FIG. 2. Furthermore, by drawing vacuum on the fuel system, fuel vapors may be drawn from the fuel tank and into the fuel vapor canister. As a result, the canister load may increase during the vacuum pulldown phase, as indicated at 520.

At time t2, responsive to the predetermined target fuel tank pressure being reached, the CPV is commanded closed (plot 508) and the CVV is maintained closed (plot 510). Accordingly, the fuel system and evaporative emissions system is sealed from both the engine intake and the atmosphere. Between time t2 and t3, pressure in the fuel system and evaporative emissions system is monitored in what may be referred to as a bleed-up phase. During the bleed-up phase, $P_{FTPT}$ bleed-up is monitored for a predetermined duration to determine the presence or absence of non-gross undesired evaporative emissions. At time t3, the pressure bleed-up remains less than the first predetermined threshold pressure represented by dashed segment 515. Accordingly, the absence of non-gross undesired evaporative emissions in the fuel system and the canister-side of the evaporative emissions system is indicated (not shown). Responsive to the bleed-up phase ending at time t3, the CVV is commanded open (plot 510) and the $P_{FTPT}$ returns to atmospheric pressure (plot 512).

Between time t3 and t4, the engine transitions from boosted conditions to non-boosted conditions. Accordingly, the manifold air pressure drops below atmospheric pressure (dashed line 506), as demonstrated by plot 504. At time t4, high load purge line (e.g., high load purge line 152 of FIG. 1) diagnostic conditions are met (plot 502), as described with reference to FIG. 3. For example, diagnostic conditions may be met at t4 responsive to the MAP falling below a threshold pressure (not shown) and the canister-side diagnostic being previously performed (e.g., within a duration) with an absence of undesired evaporative emissions indicated. Furthermore, as described with reference to FIGS. 3 and 4, at time t4, the second threshold pressure may be determined as a function of the current MAP (plot 504).

At time t4, the canister load is high and thus, the high load purge line diagnostic may be performed while simultaneously purging the canister. In other words, it may be understood that conditions are met for conducting a high load purge line diagnostic, and additionally it may be understood that conditions are met for conducting a fuel vapor canister purge operation. Accordingly, the CVV is maintained open (plot 510) and the CPV is commanded open (plot 508) to allow canister purging to occur. Beginning at time t4, the A/F may decrease (e.g., become rich) due to purging fuel vapors from the canister to the intake passage. Thus, the controller may decrease fuel injection to compensate for the increased fuel vapors entering the engine cylinders during the purge event, as shown at plot 518. As a result of the purge event, the canister load (plot 520) decreases between time t4 and time t5.

Between time t4 and t5, even with the CVV open, vacuum is drawn on the evaporative emissions control system and fuel system to purge fuel vapors from the fuel vapor canister. However, as discussed above, an amount of vacuum drawn on the fuel system and evaporative emissions system is a function of whether the high load purge line is degraded or not. More specifically, responsive to engine manifold vacuum, the check valve mounted at the connection between the high load purge line and the AIS (e.g., check valve 154 of FIG. 1) is expected to close. Thus, an amount of vacuum that may be drawn on the fuel system and evaporative emissions system for purging may be a function of whether or not the high load purge line is degraded. For example, if the check valve was stuck open, the level of vacuum drawn on the fuel system and evaporative emissions system may be less than if the check valve was closed. Similarly, under conditions where the high load purge line is degraded, the amount of vacuum drawn on the fuel system and evaporative emissions system may be less than if the high load purge line was not degraded. After a predetermined duration, at time t5, it may be determined if $P_{FTPT}$ is less than the second threshold pressure (dashed segment 516). At time t5, responsive to $P_{FTPT}$ (plot 512) being less than the second threshold pressure, high load purge line degradation is not indicated, as demonstrated by plot 522. Following t5, the purge event may continue until the canister is sufficiently empty, as discussed above.

At a later time t6 (e.g., after a period of time passes), conditions for the high load purge line diagnostic are again indicated to be met (plot 502). At time t6, it may also be assumed that canister purge conditions are met. As a result, the CVV is maintained open (plot 510) and the CPV is commanded open (plot 508), enabling canister purging to occur as the diagnostic is performed. At time t6, the canister load (plot 520) is lower than the canister load at t4; thus, the controller may decrease fuel injection by a smaller amount between t6 and t7 than between t4 and t5 to compensate for a smaller amount of fuel vapors being drawn into the intake passage.

Between time t6 and t7, as the canister is purged, vacuum is drawn on the emissions control system and fuel system due to the closed position of the check valve mounted at the connection between the high load purge line and the AIS, as discussed above. After the predetermined duration, at t7, it may be determined if $P_{FTPT}$ is less than the third threshold pressure (dashed segment 517). As described with reference to FIGS. 3 and 4, the third threshold pressure may be determined as a function of the MAP. Between time t6 and t7, the MAP is lower than the MAP between t4 and t5. Accordingly, the third threshold pressure is less than the second threshold pressure (dashed segment 516). At time t7, responsive to $P_{FTPT}$ (plot 512) being greater than the third threshold pressure, high load purge line degradation is indicated, as demonstrated by plot 522. Responsive to degradation of the high load purge line being indicated, the controller may adjust the purge schedule of the vehicle to avoid purging under boost conditions, for example. Following t7, the purge event may continue until the canister is sufficiently empty.

In this way, in a vehicle with a boosted engine, a fuel vapor canister may be purged while simultaneously diagnosing a high load purge line. Specifically, by including a check valve at the connection of the high load purge line and an engine air intake system, gross undesired evaporative emissions due to high load purge line degradation may be diagnosed. Further, the flow of unmetered air through an ejector system during natural aspiration may be prevented due to the closed position of the check valve during manifold vacuum conditions. The technical effect is to recognize that an amount of vacuum that may be drawn on a fuel system and evaporative emissions system during a purging event in an engine configured to operate under boost and natural aspiration conditions may be a function of whether a high load purge line is functioning as desired or is degraded. More specifically, a pressure threshold for indicating high load purge line degradation may be determined based on MAP, enabling the diagnostic to be performed concurrently with canister purging under manifold vacuum conditions. Opportunities for canister purging may be limited, and thus, a diagnostic that can be conducted at the same time as purging and without disrupting the purge schedule is advantageous.

One example method comprises: in a first condition, purging fuel vapors from a fuel vapor canister through an ejector unit into an air intake system of an engine without simultaneously conducting a test for undesired evaporative emissions on a high load purge line coupled between the ejector unit and the air intake system; and in a second condition, purging fuel vapors from the fuel vapor canister while simultaneously conducting the test for undesired evaporative emissions on the high load purge line. In the preceding example, additionally or optionally, the high load purge line is coupled between the ejector unit and the air intake system through a check valve, which in turn is coupled to an air compressor, the air compressor supplying compressed air into the air intake system. In any or all of the preceding examples, additionally or optionally, the first condition includes purging fuel vapors from the fuel vapor canister under boosted conditions or under natural aspiration conditions. In any or all of the preceding examples, additionally or optionally, the second condition includes purging fuel vapors from the fuel vapor canister under natural aspiration conditions but not under boosted conditions. In any or all of the preceding examples, additionally or optionally, the second condition includes an indication of an absence of undesired evaporative emissions upstream of the ejector unit. In any or all of the preceding examples, additionally or optionally, conducting the test for undesired evaporative emissions on the high load purge line further comprises: monitoring a fuel system pressure via a fuel tank pressure transducer coupled to a fuel tank which is coupled to the fuel vapor canister; and indicating a presence or absence of undesired evaporative emissions in the high load purge line as a function of a fuel system pressure threshold during purging fuel vapors from the fuel vapor canister while simultaneously conducting the test for undesired evaporative emissions on the high load purge line in the second condition. In any or all of the preceding examples, additionally or optionally, the method further comprises indicating a manifold air pressure in an intake manifold included within the air intake system via a manifold air pressure sensor positioned in the intake manifold; and adjusting the fuel system pressure threshold for indicating the presence or absence of undesired evaporative emissions in the high load purge line as a function of the indicated manifold air pressure. In any or all of the preceding examples, additionally or optionally, both the first condition and the second condition include duty cycling a canister purge valve positioned in a purge line between the ejector unit and the fuel vapor canister; wherein both the first condition and the second condition include commanding or maintaining open a canister vent valve positioned in a vent line between the fuel vapor canister and atmosphere; and wherein the second condition further includes adjusting the fuel system pressure threshold for indicating the presence or absence of undesired evaporative emission in the high load purge line as a function of the canister purge valve duty cycle.

Another example method comprises: indicating a presence or an absence of undesired evaporative emissions upstream of an ejector unit in a vehicle with an engine having an air intake system which may be configured to operate under either boosted or natural aspiration conditions; and responsive to an indication of the absence of undesired evaporative emissions upstream of the ejector unit, indicating the presence or absence of undesired evaporative emissions in a high load purge line positioned between the ejector unit and the air intake system by drawing a vacuum simultaneously on both the high load purge line and upstream of the ejector unit. In the preceding example, additionally or optionally, indicating the presence or absence of undesired evaporative emissions upstream of the ejector unit includes duty cycling a canister purge valve positioned between the ejector unit and a fuel vapor canister, the fuel vapor canister positioned in a canister-side of an evaporative emissions system, the canister-side of the evaporative emissions system coupled to a fuel system including a fuel tank configured to provide fuel to the engine; commanding closed a canister vent valve positioned in a vent line between the fuel vapor canister and atmosphere; drawing a vacuum on the fuel system and the canister-side of the evaporative emissions system by communicating vacuum from the ejector unit to the fuel system and the canister-side of the evaporative emissions system during boosted conditions until a predetermined fuel system pressure is reached; sealing the fuel system and the canister-side of the evaporative emissions system from atmosphere responsive to the predetermined fuel system pressure being reached; and indicating the absence of undesired evaporative emissions responsive to pressure bleed-up below a pressure bleed-up threshold, or responsive to a pressure bleed-up rate below a predetermined pressure bleed-up rate. In any or all of the preceding examples, additionally or optionally, the method further includes drawing the vacuum simultaneously on both the high load purge line and the canister-side of the evaporative emissions system is not conducted during boosted conditions. In any or all of the preceding examples, additionally or optionally, drawing the vacuum simultaneously on both the high load purge line and the canister-side of the evaporative emissions system further comprises: duty cycling the canister purge valve; commanding or maintaining open the canister vent valve; closing a check valve positioned between the high load purge line and the air intake system; and drawing vacuum on the fuel system, the canister-side of the evaporative emissions system, and the high load purge line by communicating vacuum from the air intake system under natural aspiration conditions to the fuel system, the canister-side of the evaporative emissions system, and the high load purge line. In any or all of the preceding examples, additionally or optionally, drawing vacuum simultaneously on the fuel system, the canister-side of the evaporative emissions system, and the high load purge line draws atmospheric air across the fuel vapor canister to purge fuel vapors stored in the fuel vapor canister to the air intake system to be combusted by the engine. In any or all of the preceding examples, additionally or optionally, indicating the presence or absence of undesired evaporative emissions in the high load purge line further comprises: indicating the absence of undesired evaporative emissions in the high load purge line responsive to pressure in the fuel system reaching a predetermined negative pressure threshold while drawing the vacuum simultaneously on both the high load purge line and the canister-side of the evaporative emissions system. In any or all of the preceding examples, additionally or optionally, the method further comprises indicating a manifold air pressure in an intake manifold of the air intake system via a manifold air pressure sensor positioned in the intake manifold; and adjusting the predetermined negative pressure threshold as a function of the indicated manifold air pressure, wherein adjusting the threshold as a function of the indicated manifold air pressure includes making the threshold more negative as the indicated manifold air pressure decreases with respect to atmospheric pressure and making the threshold less negative as the indicated manifold air pressure increases with respect to atmospheric pressure. In any or all of the preceding examples, additionally or optionally, the method further comprises adjusting the predetermined negative pressure threshold as a function of the duty cycle of the canister purge valve, wherein adjusting the predetermined negative pressure threshold as a function of the duty cycle of the canister purge valve includes making the threshold more negative as the duty cycle of the canister purge valve increases and making the threshold less negative as the duty cycle of the canister purge valve decreases.

Another example system for a vehicle comprises: an engine configured to operate under boosted and natural aspiration conditions; a fuel vapor canister positioned in a canister-side of an evaporative emissions system, the fuel vapor canister coupled to a fuel tank positioned in a fuel system; a canister vent valve positioned in a vent line that couples the fuel vapor canister to atmosphere; a canister purge valve positioned in a purge conduit coupling the fuel vapor canister to an intake manifold of the engine; an ejector unit positioned downstream of the canister purge valve and upstream of the intake manifold, the ejector unit including an ejector and a one-way vacuum actuated check valve; a high load purge line that connects an outlet of the ejector to an air intake passage upstream of a compressor; a check valve positioned between the high load purge line and the air intake passage; and a controller storing instructions in non-transitory memory that, when executed, cause the controller to: simultaneously purge fuel vapors stored in the fuel vapor canister to the intake manifold to be combusted by the engine and indicate the presence or absence of undesired evaporative emissions in the high load purge line. In the preceding example, additionally or optionally, the system may further comprise simultaneously purging fuel vapors stored in the fuel vapor canister to the intake manifold and indicating the presence or absence of undesired evaporative emissions in the high load purge line responsive to an indication of an absence of undesired evaporative emissions in the canister-side of the evaporative emissions system and fuel system; wherein the controller further stores instructions in non-transitory memory that, when executed, cause the controller to: indicate a presence or absence of undesired evaporative emissions in the fuel system and the canister-side of the evaporative emissions system by commanding closed the canister vent valve; communicate negative pressure to the fuel system and the canister-side of the evaporative emissions system via commanding open the canister purge valve until a predetermined negative pressure threshold is reached; seal the fuel system and the canister-side of the evaporative emissions system from atmosphere and from the intake manifold by commanding closed the canister purge valve and maintaining closed the canister vent valve; indicate the absence of undesired evaporative emissions responsive to a monitored pressure bleed-up in the fuel system and the canister-side of the evaporative emissions system less than a predetermined pressure bleed-up threshold or responsive to a pressure bleed-up rate in the fuel system and the canister-side of the evaporative emissions system less than a predetermined pressure bleed-up rate; and indicate the presence or absence of undesired evaporative emissions in the fuel system and the canister-side of evaporative emissions system under boost conditions, but not under natural aspiration conditions. In any or all of the preceding examples, additionally or optionally, the system further comprises a manifold air pressure sensor; and wherein the controller further stores instructions in non-transitory memory that, when executed, cause the controller to: indicate a manifold air pressure via the manifold air pressure sensor; adjust a negative pressure threshold for indicating the presence or absence of undesired evaporative emissions in the high load purge line based on the indicated manifold air pressure, and wherein the negative pressure threshold for indicating the presence or absence of undesired evaporative emissions is further adjusted as a function of a duty cycle of the canister purge valve; and wherein simultaneously purging fuel vapors stored in the fuel vapor canister to the intake manifold to be combusted by the engine includes duty cycling the canister purge valve, commanding or maintaining open the canister vent valve, and closing the check valve positioned between the high load purge line and the air intake passage. In any or all of the preceding examples, additionally or optionally, the controller further stores instructions in non-transitory memory that, when executed, cause the controller to: simultaneously purge fuel vapors stored in the fuel vapor canister to the intake manifold and indicate the presence or absence of undesired evaporative emissions in the high load purge line under natural aspiration conditions, but not under boosted engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
    in a first condition, purging fuel vapors from a fuel vapor canister through an ejector unit into an air intake system of an engine without simultaneously conducting a test for undesired evaporative emissions on a high load purge line coupled between the ejector unit and the air intake system; and
    in a second condition, purging fuel vapors from the fuel vapor canister while simultaneously conducting the test for undesired evaporative emissions on the high load purge line.

2. The method of claim 1, wherein the high load purge line is coupled between the ejector unit and the air intake system through a check valve, which in turn is coupled to an air compressor, the air compressor supplying compressed air into the air intake system.

3. The method of claim 1, wherein the first condition includes purging fuel vapors from the fuel vapor canister under boosted conditions or under natural aspiration conditions.

4. The method of claim 1, wherein the second condition includes purging fuel vapors from the fuel vapor canister under natural aspiration conditions but not under boosted conditions.

5. The method of claim 1, wherein the second condition includes an indication of an absence of undesired evaporative emissions upstream of the ejector unit.

6. The method of claim 1, wherein conducting the test for undesired evaporative emissions on the high load purge line further comprises:
    monitoring a fuel system pressure via a fuel tank pressure transducer coupled to a fuel tank which is coupled to the fuel vapor canister; and
    indicating a presence or absence of undesired evaporative emissions in the high load purge line as a function of a fuel system pressure threshold during purging fuel vapors from the fuel vapor canister while simultaneously conducting the test for undesired evaporative emissions on the high load purge line in the second condition.

7. The method of claim 6, further comprising:
    indicating a manifold air pressure in an intake manifold included within the air intake system via a manifold air pressure sensor positioned in the intake manifold; and
    adjusting the fuel system pressure threshold for indicating the presence or absence of undesired evaporative emissions in the high load purge line as a function of the indicated manifold air pressure.

8. The method of claim 6, further comprising:
    wherein both the first condition and the second condition include duty cycling a canister purge valve positioned in a purge line between the ejector unit and the fuel vapor canister;
    wherein both the first condition and the second condition include commanding or maintaining open a canister vent valve positioned in a vent line between the fuel vapor canister and atmosphere; and
    wherein the second condition further includes adjusting the fuel system pressure threshold for indicating the presence or absence of undesired evaporative emission in the high load purge line as a function of the canister purge valve duty cycle.

9. A method comprising:
    indicating a presence or an absence of undesired evaporative emissions upstream of an ejector unit in a vehicle with an engine having an air intake system which may be configured to operate under either boosted or natural aspiration conditions; and
    responsive to an indication of the absence of undesired evaporative emissions upstream of the ejector unit:

indicating the presence or absence of undesired evaporative emissions in a high load purge line positioned between the ejector unit and the air intake system by drawing a vacuum simultaneously on both the high load purge line and upstream of the ejector unit.

10. The method of claim 9, wherein indicating the presence or absence of undesired evaporative emissions upstream of the ejector unit includes duty cycling a canister purge valve positioned between the ejector unit and a fuel vapor canister, the fuel vapor canister positioned in a canister-side of an evaporative emissions system, the canister-side of the evaporative emissions system coupled to a fuel system including a fuel tank configured to provide fuel to the engine;
  commanding closed a canister vent valve positioned in a vent line between the fuel vapor canister and atmosphere;
  drawing a vacuum on the fuel system and the canister-side of the evaporative emissions system by communicating vacuum from the ejector unit to the fuel system and the canister-side of the evaporative emissions system during boosted conditions until a predetermined fuel system pressure is reached;
  sealing the fuel system and the canister-side of the evaporative emissions system from atmosphere responsive to the predetermined fuel system pressure being reached; and
  indicating the absence of undesired evaporative emissions responsive to pressure bleed-up below a pressure bleed-up threshold, or responsive to a pressure bleed-up rate below a predetermined pressure bleed-up rate.

11. The method of claim 10, wherein drawing the vacuum simultaneously on both the high load purge line and the canister-side of the evaporative emissions system is not conducted during boosted conditions.

12. The method of claim 10, wherein drawing the vacuum simultaneously on both the high load purge line and the canister-side of the evaporative emissions system further comprises:
  duty cycling the canister purge valve;
  commanding or maintaining open the canister vent valve;
  closing a check valve positioned between the high load purge line and the air intake system; and
  drawing vacuum on the fuel system, the canister-side of the evaporative emissions system, and the high load purge line by communicating vacuum from the air intake system under natural aspiration conditions to the fuel system, the canister-side of the evaporative emissions system, and the high load purge line.

13. The method of claim 12, wherein drawing vacuum simultaneously on the fuel system, the canister-side of the evaporative emissions system, and the high load purge line draws atmospheric air across the fuel vapor canister to purge fuel vapors stored in the fuel vapor canister to the air intake system to be combusted by the engine.

14. The method of claim 12, wherein indicating the presence or absence of undesired evaporative emissions in the high load purge line further comprises:
  indicating the absence of undesired evaporative emissions in the high load purge line responsive to pressure in the fuel system reaching a predetermined negative pressure threshold while drawing the vacuum simultaneously on both the high load purge line and the canister-side of the evaporative emissions system.

15. The method of claim 14, further comprising:
  indicating a manifold air pressure in an intake manifold of the air intake system via a manifold air pressure sensor positioned in the intake manifold; and
  adjusting the predetermined negative pressure threshold as a function of the indicated manifold air pressure;
  wherein adjusting the threshold as a function of the indicated manifold air pressure includes making the threshold more negative as the indicated manifold air pressure decreases with respect to atmospheric pressure and making the threshold less negative as the indicated manifold air pressure increases with respect to atmospheric pressure.

16. The method of claim 14, further comprising;
  adjusting the predetermined negative pressure threshold as a function of the duty cycle of the canister purge valve;
  wherein adjusting the predetermined negative pressure threshold as a function of the duty cycle of the canister purge valve includes making the threshold more negative as the duty cycle of the canister purge valve increases and making the threshold less negative as the duty cycle of the canister purge valve decreases.

17. A system for a vehicle, comprising:
  an engine configured to operate under boosted and natural aspiration conditions;
  a fuel vapor canister positioned in a canister-side of an evaporative emissions system, the fuel vapor canister coupled to a fuel tank positioned in a fuel system;
  a canister vent valve positioned in a vent line that couples the fuel vapor canister to atmosphere;
  a canister purge valve positioned in a purge conduit coupling the fuel vapor canister to an intake manifold of the engine;
  an ejector unit positioned downstream of the canister purge valve and upstream of the intake manifold, the ejector unit including an ejector and a one-way vacuum actuated check valve;
  a high load purge line that connects an outlet of the ejector to an air intake passage upstream of a compressor;
  a check valve positioned between the high load purge line and the air intake passage; and
  a controller storing instructions in non-transitory memory that, when executed, cause the controller to:
  simultaneously purge fuel vapors stored in the fuel vapor canister to the intake manifold to be combusted by the engine and indicate the presence or absence of undesired evaporative emissions in the high load purge line.

18. The system of claim 17, further comprising:
  simultaneously purging fuel vapors stored in the fuel vapor canister to the intake manifold and indicating the presence or absence of undesired evaporative emissions in the high load purge line responsive to an indication of an absence of undesired evaporative emissions in the canister-side of the evaporative emissions system and fuel system;
  wherein the controller further stores instructions in non-transitory memory that, when executed, cause the controller to:
    indicate a presence or absence of undesired evaporative emissions in the fuel system and the canister-side of the evaporative emissions system by commanding closed the canister vent valve;
    communicate negative pressure to the fuel system and the canister-side of the evaporative emissions system via commanding open the canister purge valve until a predetermined negative pressure threshold is reached;

seal the fuel system and the canister-side of the evaporative emissions system from atmosphere and from the intake manifold by commanding closed the canister purge valve and maintaining closed the canister vent valve;

indicate the absence of undesired evaporative emissions responsive to a monitored pressure bleed-up in the fuel system and the canister-side of the evaporative emissions system less than a predetermined pressure bleed-up threshold or responsive to a pressure bleed-up rate in the fuel system and the canister-side of the evaporative emissions system less than a predetermined pressure bleed-up rate; and indicate the presence or absence of undesired evaporative emissions in the fuel system and the canister-side of evaporative emissions system under boost conditions, but not under natural aspiration conditions.

19. The system of claim 17, further comprising:

a manifold air pressure sensor; and wherein the controller further stores instructions in non-transitory memory that, when executed, cause the controller to:

indicate a manifold air pressure via the manifold air pressure sensor;

adjust a negative pressure threshold for indicating the presence or absence of undesired evaporative emissions in the high load purge line based on the indicated manifold air pressure, and wherein the negative pressure threshold for indicating the presence or absence of undesired evaporative emissions is further adjusted as a function of a duty cycle of the canister purge valve; and wherein simultaneously purging fuel vapors stored in the fuel vapor canister to the intake manifold to be combusted by the engine includes duty cycling the canister purge valve, commanding or maintaining open the canister vent valve, and closing the check valve positioned between the high load purge line and the air intake passage.

20. The system of claim 17, wherein the controller further stores instructions in non-transitory memory that, when executed, cause the controller to:

simultaneously purge fuel vapors stored in the fuel vapor canister to the intake manifold and indicate the presence or absence of undesired evaporative emissions in the high load purge line under natural aspiration conditions, but not under boosted engine operation.

* * * * *